June 15, 1926.
B. S. STUTTS ET AL
1,589,265
SHOCK ABSORBER
Filed June 10, 1925
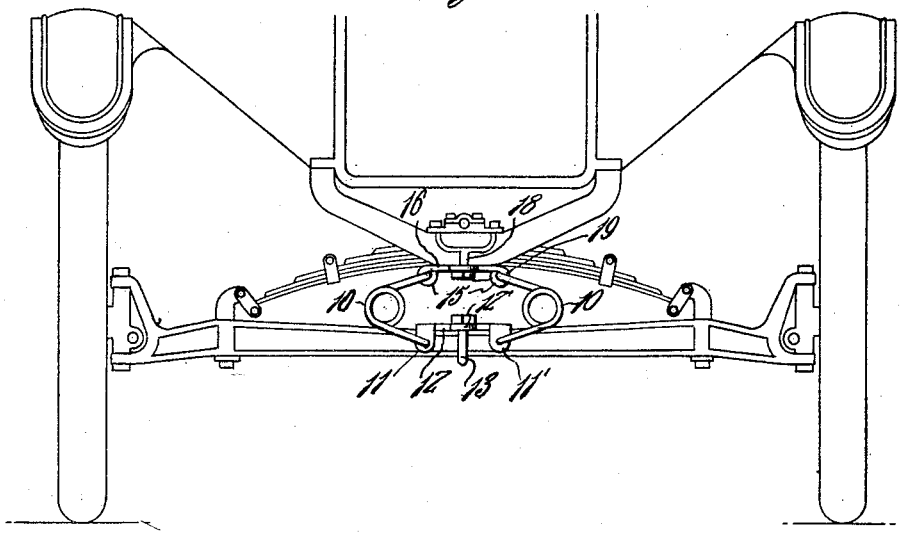
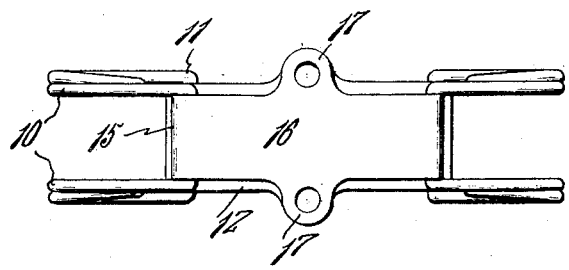
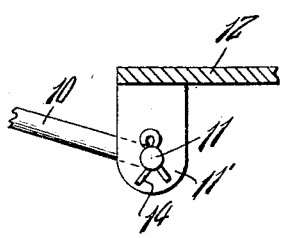
B.S.Stutts and
Chas. Roberts
INVENTORS
BY Victor J. Evans
ATTORNEY Patented June 15, 1926.

1,589,265

UNITED STATES PATENT OFFICE.

BALDWIN S. STUTTS AND CHARLES ROBERTS, OF MUNSON, FLORIDA.

SHOCK ABSORBER.

Application filed June 10, 1925. Serial No. 36,221.

This invention relates to improvements upon motor vehicles and contemplates the novel provision of a combined shock absorber and snubber, the general object being to position the combined appliance between the axles and springs with lengths of spring wire forming convolutions of spring loops intermediate their ends, which ends are in turn connected to the attaching means.

Another object of our invention resides in the peculiar construction and arrangement of parts so forming and especially in the mountings of the spring wire having their convolutions of spring loops amply and sufficiently spaced to receive the vehicle axle therebetween upon the compressing of the device.

With the above and other objects in view, the invention further includes the following novel features and details of construction to be hereinafter more fully described, illustrated in the accompanying drawings and pointed out in the appended claims.

In the drawing:—

Figure 1 is a front elevation of an automobile showing the invention applied.

Figure 2 is a top plan view of the shock absorber per se.

Figure 3 is a sectional view of one end of the supporting plates and illustrating the manner in which the springs are associated therewith.

Referring to the drawings in detail wherein like characters of reference denote corresponding parts, and in order to clearly illustrate the purposes of the above entitled invention, there is clearly shown in Figure 1 of the drawing, a front elevation of an automobile which is of a very common and well used type and which is commonly known as a Ford, which owing to the peculiar construction is probably the only type of automobile upon which the present invention may be applied in its present form but it is of course obvious that owing to the great number of Fords in use today, the sale of said type of shock absorber will not be affected as to its market value and demand when having application to this one type of vehicle.

It is the purpose of the above entitled invention to provide a combined shock absorber and snubber beneath the front spring and upon the upper side of the front axle where most of the strain and shock is directed owing to the peculiar construction and arrangement of parts of this type of automobile.

The present invention residing in the provision of shock absorbing arms formed of lengths of relatively heavy spring wire having one or more convolutions 10 provided intermediate their ends; the ends of these arms 10' are offset at their lower ends as at 11 and inserted within downwardly extending spaced parallel apertured ears 11' formed integral with an axle attaching plate 12. Oppositely extending centrally disposed apertured ears 12' are provided upon the axle attaching plate 12 and which are adapted to receive therein the upper free ends of a V-bolt 13 encircling the lower portion of the vehicle axle as clearly illustrated in Figure 1.

As clearly illustrated in Figure 3 of the drawing the lower offset end portions 11 of the arms 10' are secured within the apertured ears 11' by suitable fastening elements in the form of cotter pins 14. The yoke portions of these arms 10' are housed within looped portions 15 provided upon the opposite ends of a plate member 16. This plate member includes oppositely disposed apertured ears 17 upon its opposite sides and within which are received the lower ends of Y-bolts 18, as commonly used in holding the vehicle front spring within the front channel bar.

It is to be noted from the foregoing description and accompanying drawing that the plate 16 when so associated within the lower ends of the Y-bolts 18 that a support is thus provided for the front spring which will eliminate the braking of the channel bar. Owing to the construction of the arms 10' and their respective associations with the plates 12 and 16 that side sway will be prevented in so far as one spring will be compressed and one contracting. The relative positions and spaced relations of the convolutions 10 of the arms 10' being sufficient to allow the vehicle axle to be received therein when the said vehicle encounters a depression or rut in a roadway and when so doing the action and reaction of a combined shock absorber and snubber will take place, adding materially to the riding qualities or characteristics of this special type or form of vehicle.

The invention is susceptible of various changes in its form, proportions and minor details of construction, and the right is herein reserved to make such changes as properly fall within the scope of the appended claims.

Having thus described our invention what is claimed is:

1. A combined shock absorber and snubber for use upon motor vehicles comprising upper and lower supporting plates, the upper plate supported beneath the vehicle spring and having its ends terminating in looped portions, the lower plate being secured to the vehicle axle and having spaced parallel apertured ears arranged upon opposite sides and adjacent its ends, and a pair of yoked resilient arms forming spring convolutions intermediate their lengths and having their respective ends received within the loops and ears upon the ends of the plates.

2. A combined shock absorber and snubber for use upon motor vehicles comprising upper and lower plates respectively, the upper plate terminating at its ends in downwardly disposed looped portions and oppositely disposed attaching ears upon its opposite sides, the lower plate having pairs of spaced parallel downwardly disposed apertured ears arranged upon its opposite ends and receiving the upper portion of the vehicle axle therebetween, the lower plate further including oppositely disposed ears upon its sides for the reception of a U-bolt carried by the axle, a pair of substantially U-shaped spring arms, and said arms forming spring convolutions intermediate their lengths and having their yoke and free end portions mounted within the looped and apertured ears of the plates.

In testimony whereof we affix our signatures.

BALDWIN S. STUTTS.
CHARLES ROBERTS.